United States Patent
Sibbach et al.

(10) Patent No.: US 12,037,128 B2
(45) Date of Patent: Jul. 16, 2024

(54) SAFETY MARKERS FOR A HYDROGEN FUEL SYSTEM

(71) Applicant: General Electric Company, Schenectady, NY (US)

(72) Inventors: Arthur W. Sibbach, Boxford, MA (US); Michael A. Benjamin, Cincinnati, OH (US); Paul Burchell Glaser, Alpharetta, GA (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 549 days.

(21) Appl. No.: 17/209,719

(22) Filed: Mar. 23, 2021

(65) Prior Publication Data
US 2022/0306310 A1 Sep. 29, 2022

(51) Int. Cl.
*B64D 37/32* (2006.01)
*B64D 27/10* (2006.01)
(Continued)

(52) U.S. Cl.
CPC ............. *B64D 37/32* (2013.01); *B64D 27/10* (2013.01); *B64D 37/04* (2013.01); *B64D 37/30* (2013.01);
(Continued)

(58) Field of Classification Search
CPC ........ B64D 37/32; B64D 27/10; B64D 37/04; B64D 37/30; B64D 37/34; B64D 27/12;
(Continued)

(56) References Cited

U.S. PATENT DOCUMENTS

| 3,982,878 A | 9/1976 | Yamane et al. |
| 4,756,854 A | 7/1988 | Wegrzyn |

(Continued)

FOREIGN PATENT DOCUMENTS

| CN | 200990131 Y | 12/2007 |
| DE | 102004050419 A1 | 4/2006 |

(Continued)

OTHER PUBLICATIONS

Airbus: "Final Technical Report (Publishable Version) Project funded by the European Community under the Competitive and Sustainable Growth' Programme", Italy) SEP Division (France)THALES Avionics SA (France); Shell Hydrogen B.V. (Netherlands), Jan. 1, 1998 (Jan. 1, 1998), XP055966985, Retrieved from the Internet: URL:https://www.fzt.haw-hamburg.de/pers/Scholz/dglr/hh/text_2004_02_26_Cryoplane.pdf [retrieved on Sep. 30, 2022].

(Continued)

Primary Examiner — Andrew J. Oyer
(74) Attorney, Agent, or Firm — Venable LLP; David D. Leege; Michele V. Frank

(57) ABSTRACT

A hydrogen fuel including a safety marker and a method and apparatus for adding the safety marker to the hydrogen fuel. The hydrogen fuel may be stored in a tank in a liquid phase and then heated to at least one of a gaseous phase and a supercritical phase. The safety marker may be added to the hydrogen fuel when the hydrogen fuel is in the at least one of the gaseous phase and the supercritical phase after heating the hydrogen fuel. The hydrogen fuel may be delivered in the at least one of the gaseous phase and the supercritical phase to a power generator, such as a gas turbine engine. The safety marker may be a visual safety marker, such as a noble gas, or an odorant.

7 Claims, 12 Drawing Sheets

(51) Int. Cl.
*B64D 37/04* (2006.01)
*B64D 37/30* (2006.01)
*B64D 37/34* (2006.01)
*C06B 23/00* (2006.01)
*C06B 43/00* (2006.01)

(52) U.S. Cl.
CPC ............ *B64D 37/34* (2013.01); *C06B 23/008* (2013.01); *C06B 43/00* (2013.01)

(58) Field of Classification Search
CPC ......... C06B 23/008; C06B 43/00; F02C 3/22; F02C 7/224; F02K 3/06; F02M 21/0206; F02M 21/0293
See application file for complete search history.

(56) References Cited

U.S. PATENT DOCUMENTS

| | | |
|---|---|---|
| 4,784,959 A | 11/1988 | Wegrzyn |
| 4,822,743 A | 4/1989 | Wegrzyn |
| 4,844,743 A | 7/1989 | Koblenzer et al. |
| 7,192,459 B2 | 3/2007 | Puri et al. |
| 7,811,688 B2 | 10/2010 | Flynn et al. |
| 7,915,047 B2 | 3/2011 | Thorn et al. |
| 8,470,933 B2 | 6/2013 | Thorn et al. |
| 8,858,679 B2 | 10/2014 | Buhrman et al. |
| 9,045,347 B2 * | 6/2015 | Pope .................. C04B 35/6267 |
| 10,112,486 B2 | 10/2018 | Ban et al. |
| 10,222,291 B2 | 3/2019 | Thompson et al. |
| 10,578,585 B1 | 3/2020 | Gerardi et al. |
| 2020/0300456 A1 * | 9/2020 | Fuller .................. F23C 99/001 |
| 2020/0340881 A1 | 10/2020 | Hattori |

FOREIGN PATENT DOCUMENTS

| | | |
|---|---|---|
| EP | 2177592 A1 | 4/2010 |
| EP | 3095498 B1 | 10/2019 |
| FR | 2645622 A1 | 10/1990 |
| GB | 2270742 A | 3/1994 |
| GB | 2281228 A | 3/1995 |
| JP | 2007103335 A | 4/2007 |
| WO | 2004/092054 A3 | 10/2004 |
| WO | 2012013351 A1 | 2/2012 |
| WO | 2019/138918 A1 | 7/2019 |

OTHER PUBLICATIONS

Bjorn Fehrm, "Bjorn's Corner: the challenges of hydrogen. Part 29. Gas turbine heat management," Leeham News and Analysis, Mar. 19, 2021, accessed online at <leehamnews.com/2021/03/19/bjorns-corner-the-challenges-of-hydrogen-part-29-gas-turbine-heat-management/>.

* cited by examiner

SAFETY MARKERS FOR A HYDROGEN FUEL SYSTEM

TECHNICAL FIELD

Preferred embodiments described herein relate to fuel systems, and, in particular, to fuel systems for aircraft.

BACKGROUND

The propulsion system for commercial aircraft typically includes one or more aircraft engines, such as turbofan jet engines. The turbofan jet engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number. The aviation turbine fuel is a relatively power-dense fuel that is relatively easy to transport and stays in a liquid phase through most ambient operating conditions for aircraft. Such fuel produces carbon dioxide upon combustion, and improvements to reduce such carbon dioxide emissions in commercial aircraft are desired.

BRIEF SUMMARY

According to an embodiment, a fuel includes hydrogen and a visual safety marker, the visual safety marker being a noble gas.

According to an embodiment, a fuel system for a vehicle having a power generator, the fuel system includes: a fuel tank for holding a hydrogen fuel in a liquid phase; a fuel delivery assembly extending from the fuel tank to a power generator, the fuel delivery assembly being configured to provide the hydrogen fuel from the fuel tank to the power generator; a vaporizer in communication with the fuel delivery assembly for heating the hydrogen fuel in the liquid phase to at least one of a gaseous phase and a supercritical phase, the vaporizer being located between the fuel tank and the power generator; a safety marker tank for holding a safety marker; and a safety marker delivery assembly extending from the safety marker tank to the fuel delivery assembly, the safety marker delivery assembly being (i) connected to the fuel delivery assembly at a safety marker introduction position and (ii) configured to add a safety marker into the hydrogen fuel when the hydrogen fuel is in the at least one of the gaseous phase and the supercritical phase, the safety marker introduction position being the vaporizer or a position upstream of the vaporizer.

Additional features, advantages, and embodiments of the present disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

To reduce carbon dioxide emissions from commercial aircraft, a hydrogen fuel may be used. Hydrogen fuel, however, poses a number of challenges as compared to combustible hydrocarbon liquid fuel. For example, hydrogen fuel has a relatively low boiling point, and, in its gaseous form, hydrogen fuel has a much lower power density. Hydrogen fuel, when in a gaseous form, also tends to seep through materials and attachment points between components without leaving residue. Moreover, hydrogen fuel is colorless and odorless. When hydrogen fuel burns, it has a flame that is not visible to the naked eye under normal lighting conditions.

The present disclosure discusses ways to improve the safety of hydrogen fuel systems and particularly such fuel systems used in aircraft. Preferred embodiments described herein relate to safety markers for use in a hydrogen fuel system, and, in particular, to a hydrogen fuel system for an aircraft. As discussed above, hydrogen fuel is colorless and odorless, and when hydrogen fuel burns, it has a flame that is not visible to the naked eye under normal lighting conditions. This presents a safety concern as personnel around the aircraft, such as maintenance workers or other ground personnel, may not detect the presence of a leak or even a hydrogen fire. In the present disclosure, a safety marker is added to the hydrogen fuel to alert personnel to the presence of a leak. One such safety marker discussed herein is a visual safety marker, such as a noble gas, that is added to the hydrogen fuel. The visual safety marker enables the flame of hydrogen to be visible to the naked eye under normal lighting conditions such as sunlight. Another such safety marker discussed herein is an odorant that enables personnel to smell the hydrogen fuel in the event of a leak. Various safety markers are discussed herein, and these safety markers may be used individually or in any combination. For example, both a visual safety marker and an odorant may be used.

When hydrogen fuel is used as the fuel in an aircraft application, the hydrogen fuel is typically stored as a liquid. The safety markers discussed herein, other than helium, may not be suitable to be added and mixed with the hydrogen fuel while the hydrogen fuel is in the liquid phase. The present disclosure discusses systems and methods to introduce the safety marker into the fuel system, and to remove and to reuse the safety markers.

Figure 1:
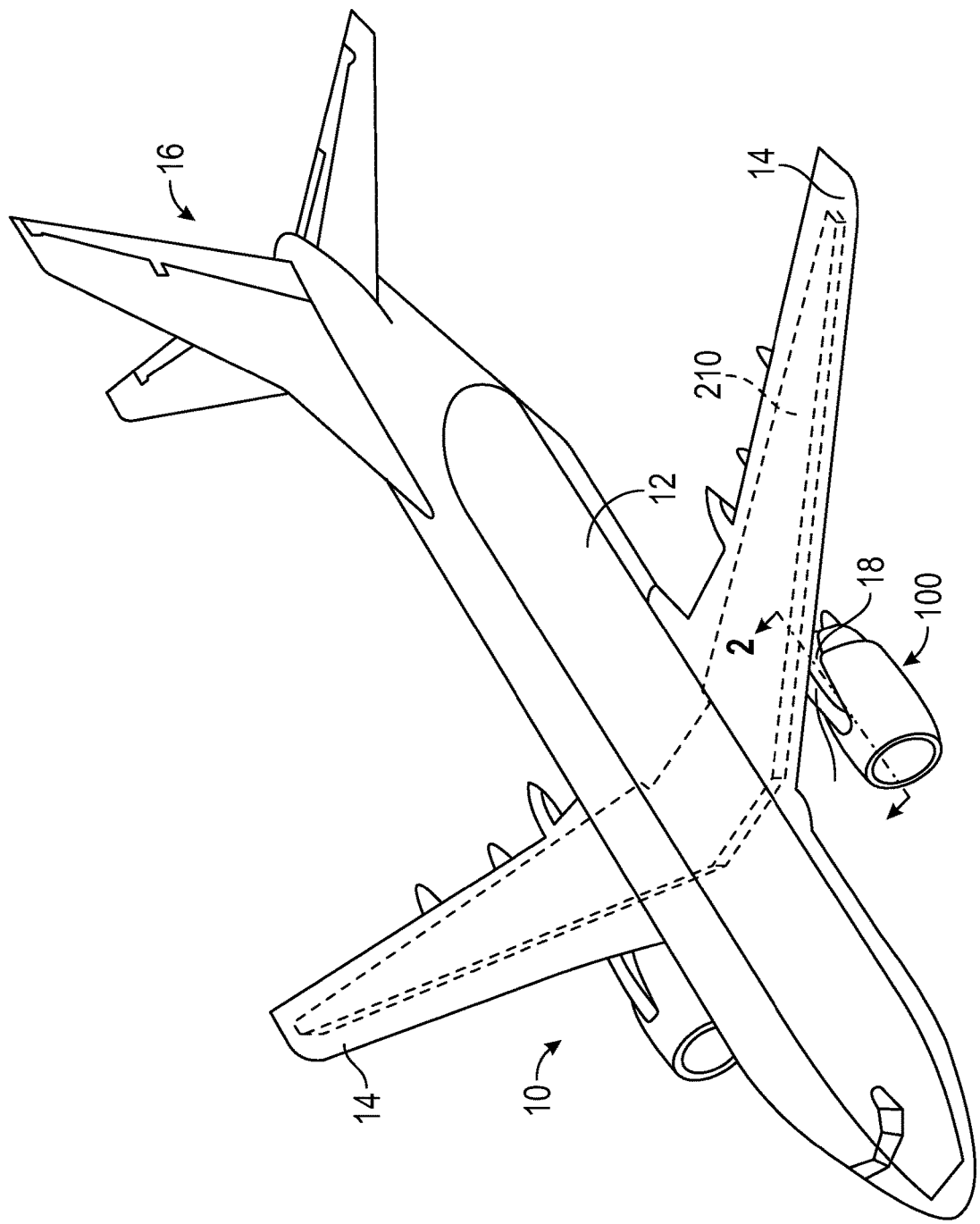
FIG. 1 is a schematic perspective view of an aircraft having a fuel system according to an embodiment of the present disclosure.

The safety markers, the fuel systems, and the methods discussed herein are particularly suited for use on aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200 (see FIG. 3). In the embodiments discussed herein, the fuel is a hydrogen fuel that is stored in a fuel tank 210 of the fuel system 200. As shown in FIG. 1, at least a portion of the fuel tank 210 is located in each wing 14 and a portion of the fuel tank 210 is located in the fuselage 12 between the wings 14. The fuel tank 210, however, may be located at other suitable locations in the fuselage 12 or the wing 14. The fuel tank 210 may also be located entirely within the fuselage 12 or the wing 14. The fuel tank 210 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). In addition, the embodiments described herein may also be applicable to other applications where hydrogen is used as a fuel. The engines described herein are gas turbine engines, but the embodiments described herein also may be applicable to other engines. Further, the engine, specifically, the gas turbine engine, is an example of a power generator using hydrogen as a fuel, but hydrogen may be used as a fuel for other power generators, including, for example, fuel cells (hydrogen fuel cells). Such power generators may be used in various applications including stationary power generation systems (including both gas turbines and hydrogen fuel cells) and other vehicles beyond the aircraft 10 explicitly described herein, such as boats, ships, cars, trucks, and the like.

For the embodiment depicted, the power generator is an engine 100 and, in particular, a high bypass turbofan engine. The engine 100 may also be referred to as a turbofan engine 100 herein. FIG. 2 is a schematic, cross-sectional view of one of the engines 100 used in the propulsion system for the aircraft 10 shown in FIG. 1. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

Figure 2:
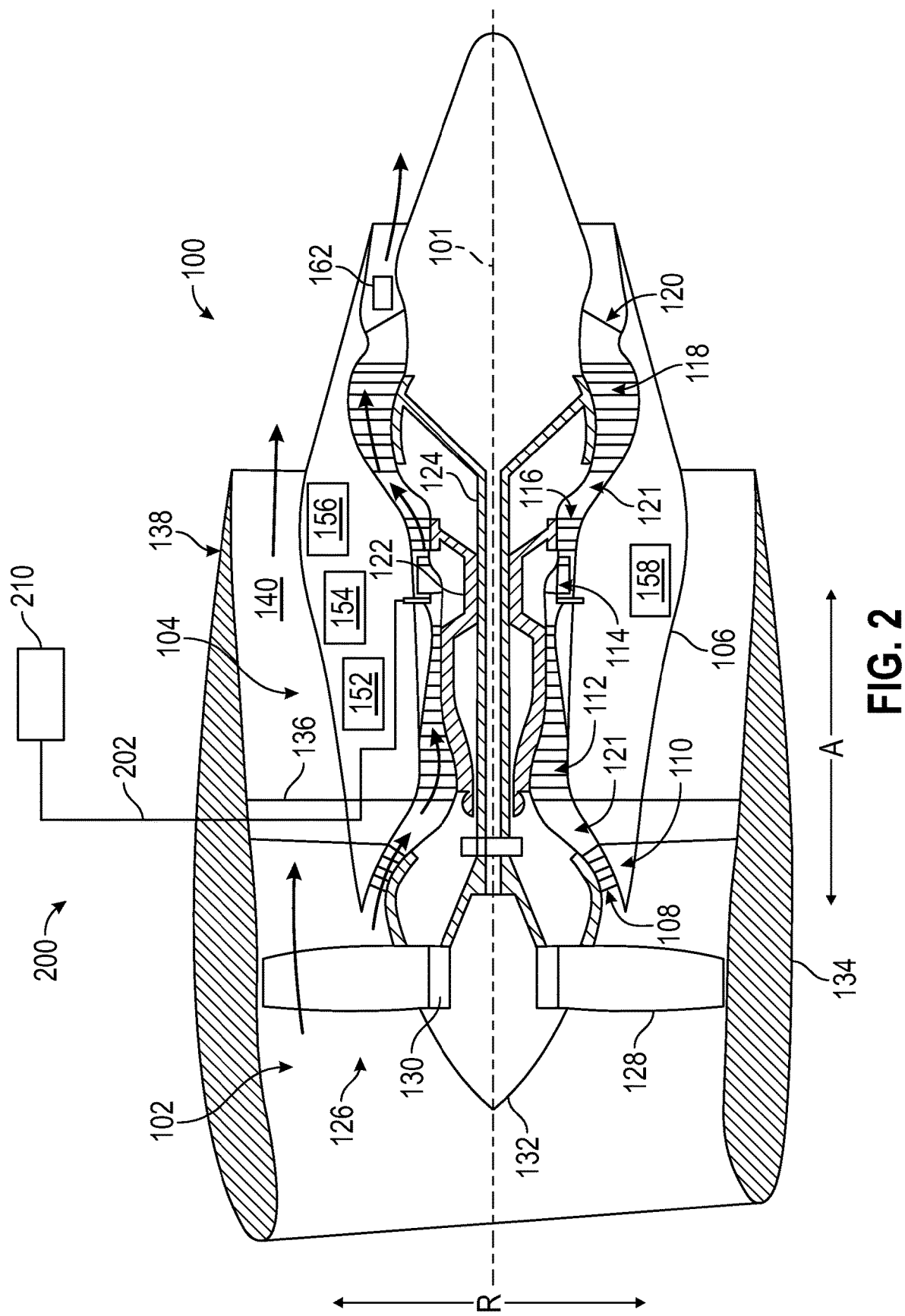
FIG. 2 is a schematic, cross-sectional view, taken along line 2-2 in FIG. 1, of a gas turbine engine that is used as a power generator for the aircraft shown in FIG. 1.

The turbomachine 104 depicted in FIG. 2 includes a tubular outer casing 106 that defines an annular inlet 108. The outer casing 106 encases, in a serial flow relationship, a compressor section including a booster or low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the annular inlet 108 to the jet exhaust nozzle section 120. The turbofan engine further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130 in a spaced-apart manner. The fan blades 128 and the disk 130 are rotatable, together, about the longitudinal centerline (axis) 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 210 to the engine 100, and more specifically to a fuel manifold 172 (not labeled in FIG. 2; see FIG. 3) of the combustion section 114 of the turbomachine 104 of the turbofan engine 100.

The turbofan engine 100 also includes various accessory systems to aid in the operation of the turbofan engine 100 and/or an aircraft including the turbofan engine 100. For example, the turbofan engine 100 may include a main lubrication system 152, a compressor cooling air (CCA) system 154, an active thermal clearance control (ATCC) system 156, and generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components. The compressor cooling air (CCA) system 154 provides air from one or both of the HP compressor 112 or LP compressor 110 to one or both of the HP turbine 116 or LP turbine 118. The active thermal clearance control (ATCC) system 156 cools a casing of the turbine section to maintain a clearance between the various turbine rotor blades and the turbine casing within a desired range throughout various engine operating conditions. The generator lubrication system 158 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100.

Heat from these accessory systems 152, 154, 156, 158, and other accessory systems, may be provided to various heat sinks as waste heat from the turbofan engine 100 during operation, such as to various vaporizers 220, as discussed below. Additionally, the turbofan engine 100 may include one or more heat exchangers 162 within, for example, the turbine section or 120 for extracting waste heat from an airflow therethrough to also provide heat to various heat sinks, such as the vaporizers 220, discussed below.

It will be appreciated, however, that the turbofan engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines, as discussed above. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158, and 162, discussed above.

Figure 3:
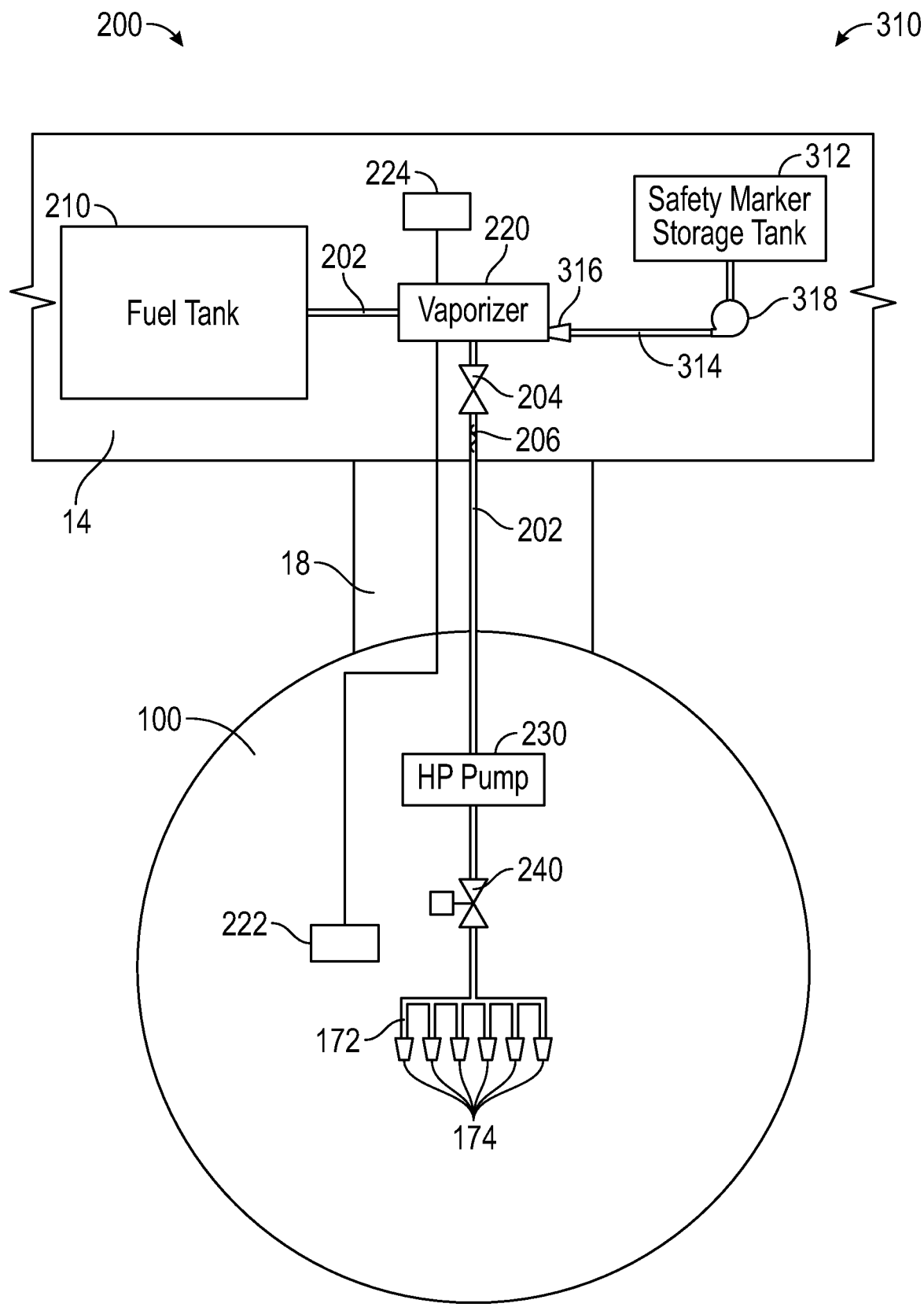
FIG. 3 is a schematic view of the fuel system including a safety marker introduction system according to an embodiment of the present disclosure.

FIG. 3 is a schematic view of the fuel system 200 according to an embodiment of the present disclosure that is configured to store the hydrogen fuel for the engine 100 in the fuel tank 210 and to deliver the hydrogen fuel to the engine 100 via a fuel delivery assembly 202. The fuel delivery assembly 202 includes tubes, pipes, and the like, to fluidly connect the various components of the fuel system 200 to the engine 100. The fuel tank 210 may be configured to hold the hydrogen fuel at least partially within the liquid phase, and may be configured to provide hydrogen fuel to the fuel delivery assembly 202 substantially completely in the liquid phase, such as completely in the liquid phase. For example, the fuel tank 210 may have a fixed volume and contain a volume of the hydrogen fuel in the liquid phase (liquid hydrogen fuel). As the fuel tank 210 provides hydrogen fuel to the fuel delivery assembly 202 substantially completely in the liquid phase, the volume of the liquid hydrogen fuel in the fuel tank 210 decreases and the remaining volume in the fuel tank 210 is made up by, for example, hydrogen in the gaseous phase (gaseous hydrogen). It will be appreciated that as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 210 at very low (cryogenic) temperatures. For example, the hydrogen fuel may be stored in the fuel tank 210 at about −253 Deg. Celsius or less at atmospheric pressure, or at other temperatures and pressures to maintain the hydrogen fuel substantially in the liquid phase. The fuel tank 210 may be made from known materials such as titanium, Inconel®, aluminum, or composite materials. The fuel tank 210 and the fuel system 200 may include a variety of supporting structures and components to facilitate storing the hydrogen fuel in such a manner.

The liquid hydrogen fuel is supplied from the fuel tank 210 to the fuel delivery assembly 202. The fuel delivery assembly 202 may include one or more lines, conduits, etc., configured to carry the hydrogen fuel between the fuel tank 210 and the engine 100. The fuel delivery assembly 202 thus provides a flow path of the hydrogen fuel from the fuel tank 210 to the engine 100. Herein, the terms "downstream" and "upstream" may be used to describe the position of components relative to the direction of flow of the hydrogen fuel in the flow path of the fuel delivery assembly 202. The fuel delivery assembly 202 may also include various valves (for example, valve 204) and other components to deliver the hydrogen fuel to the engine 100 that are not shown in FIG. 3.

Figure 4:
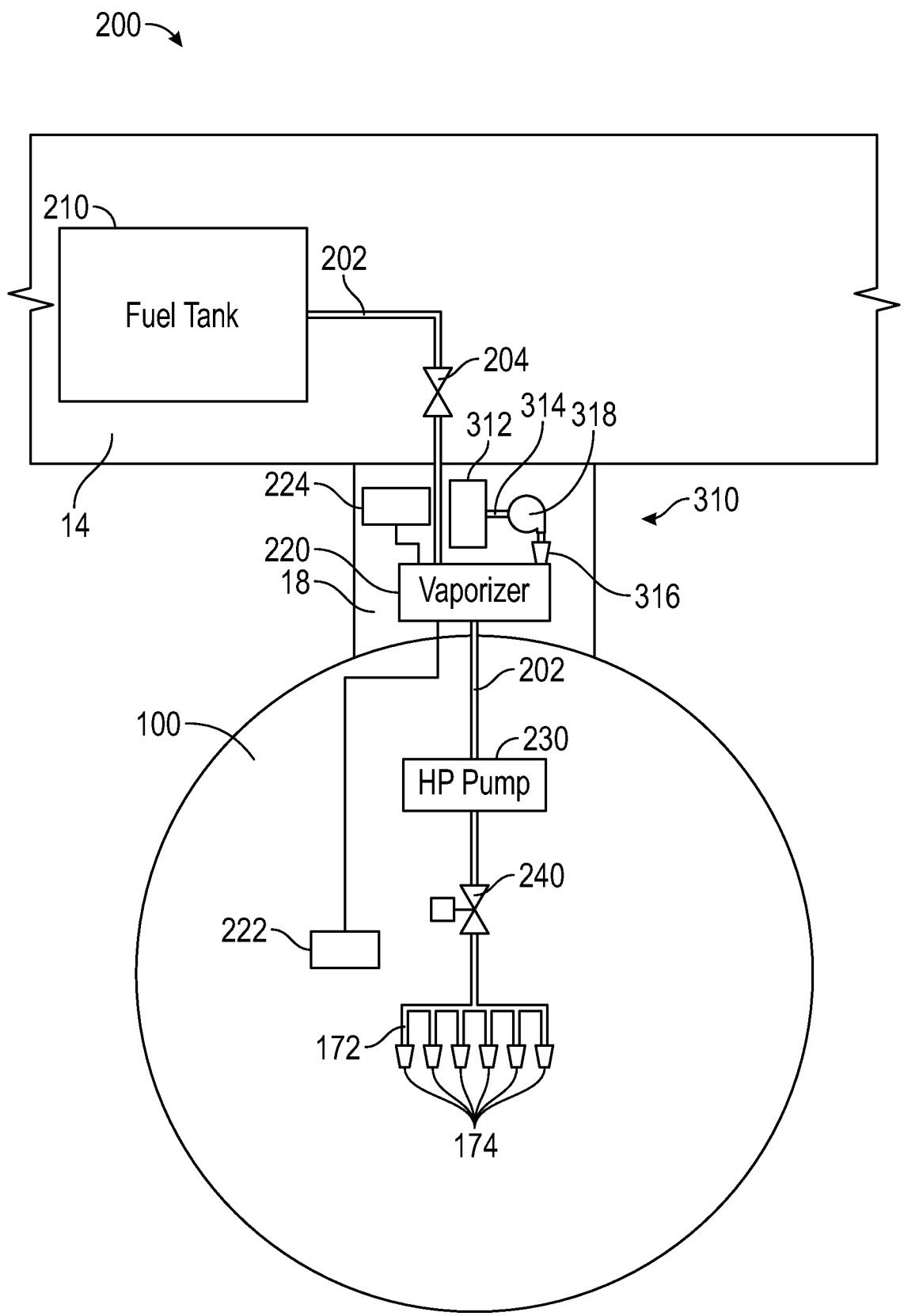
FIG. 4 is a schematic view of the fuel system with a vaporizer the fuel system at a location different than in the fuel system shown in FIG. 3.
Figure 5:
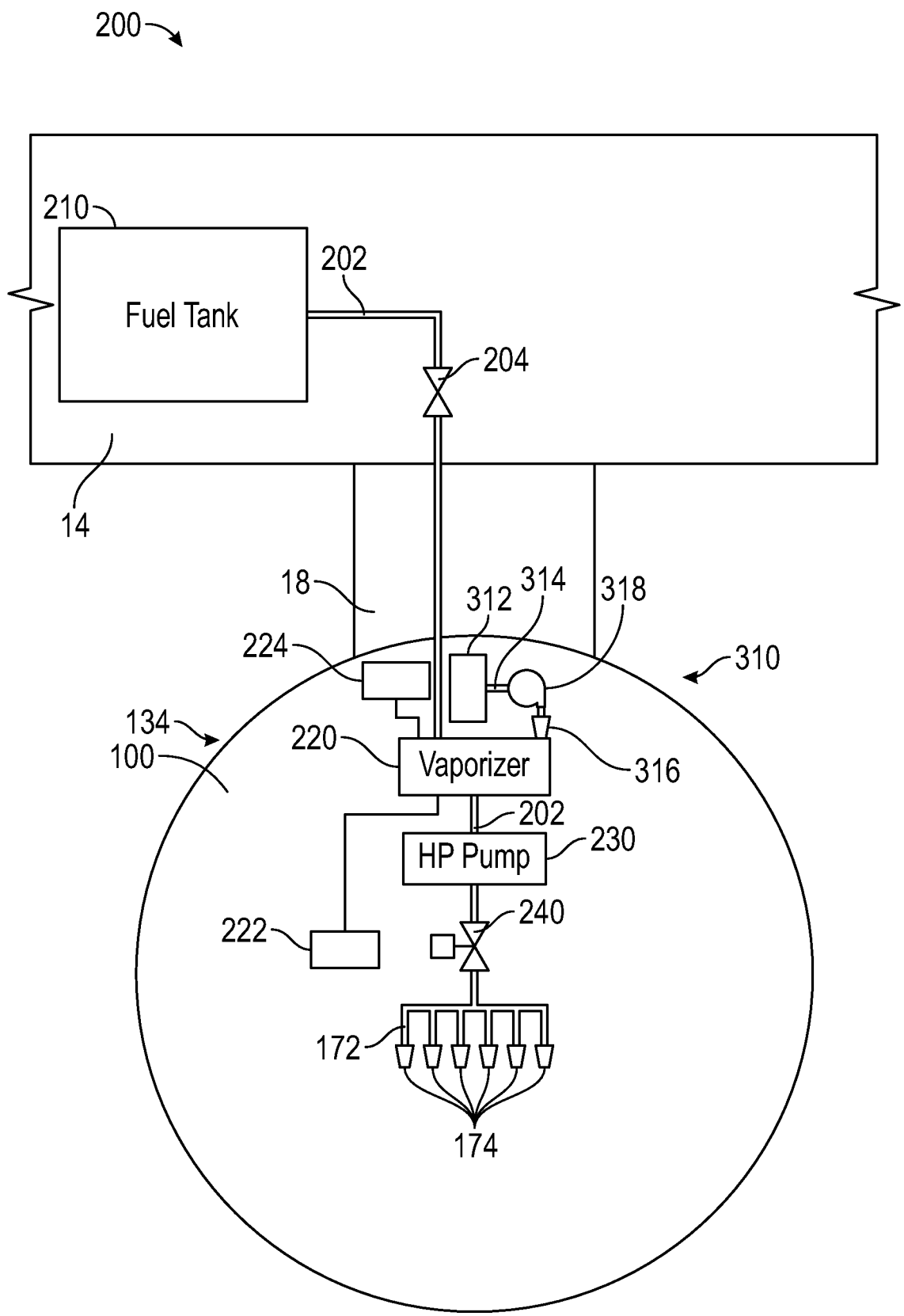
FIG. 5 is a schematic view of the fuel system with the vaporizer the fuel system at another location different than in the fuel systems shown in FIGS. 3 and 4.

The hydrogen fuel is delivered to the engine by the fuel delivery assembly 202 in the gaseous phase, the supercritical phase, or both (at least one of the gaseous phase and the supercritical phase). The fuel system 200 thus includes a vaporizer 220 in fluid communication with the fuel delivery assembly 202 to heat the liquid hydrogen fuel flowing through the fuel delivery assembly 202. The vaporizer 220 is positioned in the flow path of the hydrogen fuel between the fuel tank 210 and the engine 100. In the embodiment shown in FIG. 3, the vaporizer 220 is positioned at least partially within the fuselage 12 or the wing 14, such as at least partially within the wing 14. The vaporizer 220 may, however, be positioned at other suitable locations in the flow path of the hydrogen between fuel tank 210 and the engine 100. For example, the vaporizer 220 may be positioned external to the fuselage 12 and the wing 14 and positioned at least partially within the pylon 18, as shown in FIG. 4, or the engine 100, as shown in FIG. 5. When positioned in the engine 100, the vaporizer may be located in the nacelle 134, for example. Although only one vaporizer 220 is shown in FIG. 3, the fuel system 200 may include multiple vaporizers 220. For example, when a vaporizer 220 is positioned in the engine 100 or in the pylon 18 and functions as a primary vaporizer configured to operate once the engine 100 is in a thermally stable condition, another vaporizer 220 is positioned upstream of the primary vaporizer and proximate to the fuel tank 210 and functions as a primer vaporizer during start-up (or prior to start-up) of the engine 100.

The vaporizer 220 is in thermal communication with at least one heat source 222, 224. In this embodiment, the vaporizer 220 is in thermal communication with a primary heat source 222 and an auxiliary heat source 224. In this embodiment, primary heat source 222 is waste heat from the engine 100, and the vaporizer 220 is thus thermally connected to at least one of the main lubrication system 152, the compressor cooling air CCA system 154, the active thermal clearance control (ATCC) system 156, the generator lubrication system 158, and the heat exchangers 162 to extract waste heat from the engine 100 to heat the hydrogen fuel. In such a manner, it will be appreciated that the vaporizer 220 is configured to operate by drawing heat from the primary heat source 222 once the engine 100 is capable of providing enough heat, via the heat source 224, to the vaporizer 220, in order to facilitate operation of the vaporizer 220.

The vaporizer 220 may be heated by any suitable heat source, and, in this embodiment, for example, the auxiliary heat source 224 is a heat source external to the engine 100. The auxiliary heat source 224 may include, for example, an electrical power source, a catalytic heater or burner, and/or a bleed airflow from an auxiliary power unit. The auxiliary heat source 224 may be integral to the vaporizer 220, such as when the vaporizer 220 includes one or more electrical resistance heaters, or the like, that are powered by the electrical power source. In this configuration the auxiliary heat source 224 may provide heat for the vaporizer 220 independent of whether or not the engine 100 is running and can be used, for example, during start-up (or prior to start-up) of the engine 100.

As noted, the vaporizer 220 is in communication with the flow of the hydrogen fuel through the fuel delivery assembly 202. The vaporizer 220 is configured to draw heat from at least one of the primary heat source 222 and the auxiliary heat source 224 to heat the flow of hydrogen fuel from a substantially completely liquid phase to a substantially completely gaseous phase or to a substantially completely supercritical phase.

The fuel delivery assembly 202 also includes a high-pressure pump 230 to induce the flow of the hydrogen fuel through the fuel delivery assembly 202 to the engine 100. The high-pressure pump 230 may generally be the primary source of pressure rise in the fuel delivery assembly 202 between the fuel tank 210 and the engine 100. The high-pressure pump 230 may be configured to increase a pressure in the fuel delivery assembly 202 to a pressure greater than a pressure within a combustion chamber of the combustion section 114 of the engine 100. For example, the high-pressure pump 230 may be configured to increase a pressure in the fuel delivery assembly 202 to at least four hundred pounds per square inch ("psi"), such as to at least five hundred psi, such as to at least six hundred psi, such as to at least seven hundred psi, such as to at least seven hundred fifty psi, such as up to two thousand psi.

The high-pressure pump 230 is positioned within the flow of hydrogen fuel in the fuel delivery assembly 202 at a location downstream of the vaporizer 220. In this embodiment, the high-pressure pump 230 is positioned external to the fuselage 12 and the wing 14, and is positioned at least partially within the pylon 18, or at least partially within the engine 100. More specifically, the high-pressure pump 230 is positioned within the engine 100. With the high-pressure pump 230 located in such a position, the high-pressure pump 230 may be any suitable pump configured to receive the flow of hydrogen fuel in substantially completely a gaseous phase or a supercritical phase. It will be appreciated, however, that, in other embodiments, the high-pressure pump 230 may be positioned at any other suitable locations, including other positions within the flow path of the hydrogen fuel. For example, the high-pressure pump 230 may be located upstream of the vaporizer 220 and may be configured to receive the flow of hydrogen fuel through the fuel delivery assembly 202 in a substantially completely liquid phase.

The fuel system 200 also includes a fuel metering unit in fluid communication with the fuel delivery assembly 202. In this embodiment, the fuel metering unit is a metering valve 240 positioned downstream of the vaporizer 220 and the high-pressure pump 230. The fuel system 200 is configured to provide the metering valve 240, and the metering valve 240 is configured to receive, hydrogen fuel in a substantially completely gaseous phase, or in a substantially completely supercritical phase. The metering valve 240 is further configured to provide the flow of fuel to the engine 100 in a desired manner. More specifically, as depicted schematically in FIG. 3, the metering valve 240 is configured to provide a desired volume of hydrogen fuel, at, for example, a desired flow rate, to a fuel manifold 172 of the engine 100. The fuel manifold 172 then distributes (provides) the hydrogen fuel received to a plurality of fuel nozzles 174 within the combustion section 114 of the engine 100 where the hydrogen fuel is mixed with compressed air and the mixture of hydrogen fuel and compressed air is combusted to generate combustion gases that drive the engine 100. Adjusting the metering valve 240 changes the volume of fuel provided to the combustion section 114 of the engine 100 and, thus, changes the amount of propulsive thrust produced by the engine 100 to propel the aircraft 10.

The hydrogen fuel used in the engine 100 and in the fuel system 200 may be substantially pure hydrogen molecules (diatomic hydrogen). As diatomic hydrogen is the smallest molecule known to exist, hydrogen can be difficult to contain, particularly, in the gaseous form. Hydrogen, when in a gaseous form, also tends to seep through materials and attachment points between components without leaving residue. The hydrogen is prone to leak through conventional seals and other small orifices such as cracks that may form in the fuel system 200 over time. Hydrogen, however, burns with a nearly colorless flame that is invisible in sunlight and is an odorless, colorless gas. As a result, leaks may be difficult to detect.

A safety marker is added to the hydrogen fuel in the fuel system 200. The added safety marker facilitates the detection of leaks and helps to prevent injury or other adverse event. The safety marker added preferably enables a user, such as a maintenance worker or other ground personnel around the aircraft 10, to detect the hydrogen fuel leak and take appropriate actions. Suitable safety markers thus enable the hydrogen fuel to be readily detectable to the human senses such as smell or sight.

One such safety marker is an odorant. Suitable odorants include, for example, mercaptan or a sulfide, such as hydrogen sulfide, benzyl sulfide, bimethyl sulfide, diphenyl sulfide, and the like. Such odorants may be suitable in this application as these odorants can be burned as fuel along with the hydrogen, if desired, and they produce a perceptible smell that can be readily detected by the human nose. The odorant is preferably added to the hydrogen fuel in the gaseous phase or supercritical phase at a mole fraction in the fuel between $1 \times 10^{-9}$ mol/mol and $1 \times 10^{-2}$ mol/mol.

Another suitable safety marker is a molecule, compound, or element that can be added to the hydrogen fuel such that, when the hydrogen fuel burns, the flame of the burning hydrogen is visible to the naked eye, particularly, in sunlight. Preferably, the flame would emit light having wavelengths in the visible spectrum that provide a color to the flame. Such a safety marker may be referred to herein as a visual safety marker. A suitable visual safety marker is a noble gas, such as helium, neon, argon, krypton, xenon, and radon. Adding the noble gas to the hydrogen fuel colors the flame of the burning hydrogen such that it is visible to a naked eye under normal conditions, such as sunlight or other typical lighting conditions. Being visible to a human allows the person to avoid the flame or to take other appropriate actions. Noble gases, and, in particular, helium, neon, argon, and xenon, produce a colored flame when included in a flammable mixture, such as the hydrogen fuel discussed herein, even though the noble gas itself does not burn. The molecules of the noble gas are excited by the heat of the flame and give off a visible colored light that can be detected by the naked eye. The noble gas is preferably added to the hydrogen fuel in the gaseous phase or supercritical phase at a mole fraction in the fuel between $1 \times 10^{-10}$ mol/mol and $1 \times 10^{-2}$ mol/mol.

As discussed above, the hydrogen fuel is preferably stored in the fuel tank 210 in the liquid phase. Helium is a safety marker that can be added to the hydrogen fuel when it is in the liquid phase, and the helium can remain suspended in the hydrogen fuel when the hydrogen fuel is a liquid. Thus, preferred embodiments include a fuel comprising hydrogen and helium. Other preferred embodiments include a fuel consisting essentially of hydrogen and helium, and a fuel consisting of hydrogen and helium. The hydrogen in the fuel, particularly, in the liquid form, is diatomic hydrogen molecules. These hydrogen fuels may preferably be a liquid stored in the fuel tank 210 and used in the fuel system 200 discussed herein.

Although the safety markers discussed herein, other than helium, may not be suitable to be added and mixed with the hydrogen fuel while the hydrogen fuel is in a liquid phase, these other safety markers can nevertheless be used with the fuel system 200 discussed herein.

Figure 6:
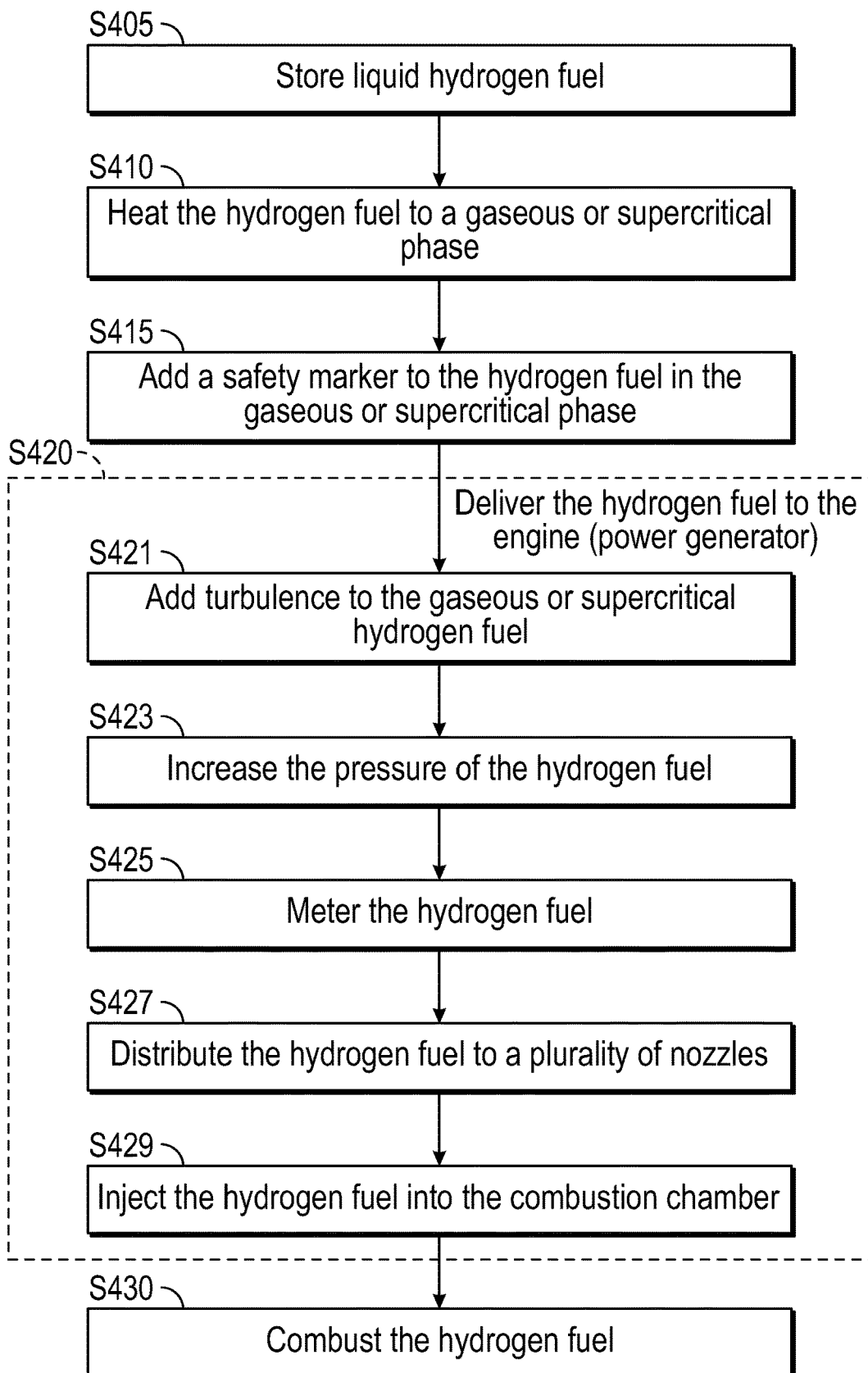
FIG. 6 is a flow chart showing a method of adding a safety marker to hydrogen fuel in the fuel delivery system shown in FIG. 3.

FIG. 6 is a flow chart showing a method of adding a safety marker to hydrogen fuel in a fuel delivery system. The fuel system 200 may further include a safety marker introduction system 310, as shown in FIG. 3, and the method of adding the safety marker to the hydrogen fuel will be described with reference to the safety marker introduction system 310. It will be appreciated however, that the method of adding a safety marker to hydrogen fuel is not limited to the specific components of the safety marker introduction system 310 and the method may be implemented with other suitable components and configurations.

As discussed above, liquid hydrogen fuel is stored in the fuel tank 210 (step S405) and then flows into the fuel delivery assembly 202. In step S410, the hydrogen fuel is then heated, by the vaporizer 220 in this embodiment, from a liquid to a gas. In this embodiment, the vaporizer 220 heats the liquid fuel from a substantially completely liquid phase to a substantially completely gaseous phase or to a substantially completely supercritical phase. Once the fuel it heated to at least a partially gaseous phase, the safety markers discussed above can be added to the hydrogen fuel.

In step S415, at least one safety marker, such as the odorant or visual safety marker, is added to the hydrogen fuel using, in this embodiment, the safety marker introduction system 310 (see, for example, FIG. 3). The safety marker introduction system 310 includes a safety marker storage tank 312 that stores the at least one safety marker. The safety markers discussed herein may be stored in a gaseous form in the safety marker storage tank 312. The safety marker flows from the safety marker storage tank 312 into a safety marker delivery assembly 314. The safety marker delivery assembly 314 includes tubes, pipes, and the like, to fluidly connect the various components of the safety marker introduction system 310 to the fuel system 200. From the safety marker delivery assembly 314, the safety marker is introduced at a rate appropriate to obtain the desired concentrations discussed above. In this embodiment, a nozzle 316 is used to inject the safety marker into the gaseous hydrogen fuel at the desired rate. The safety marker may also be introduced to the hydrogen fuel using other suitable methods and devices, such as a method of entrainment using an eductor, for example. The safety marker introduction system 310 may also include a pump 318 to increase the pressure of the safety marker in the safety marker delivery assembly 314 to a pressure greater than that of the fuel system 200 at the introduction location, so that the safety marker flows into the fuel system 200.

Figure 7:
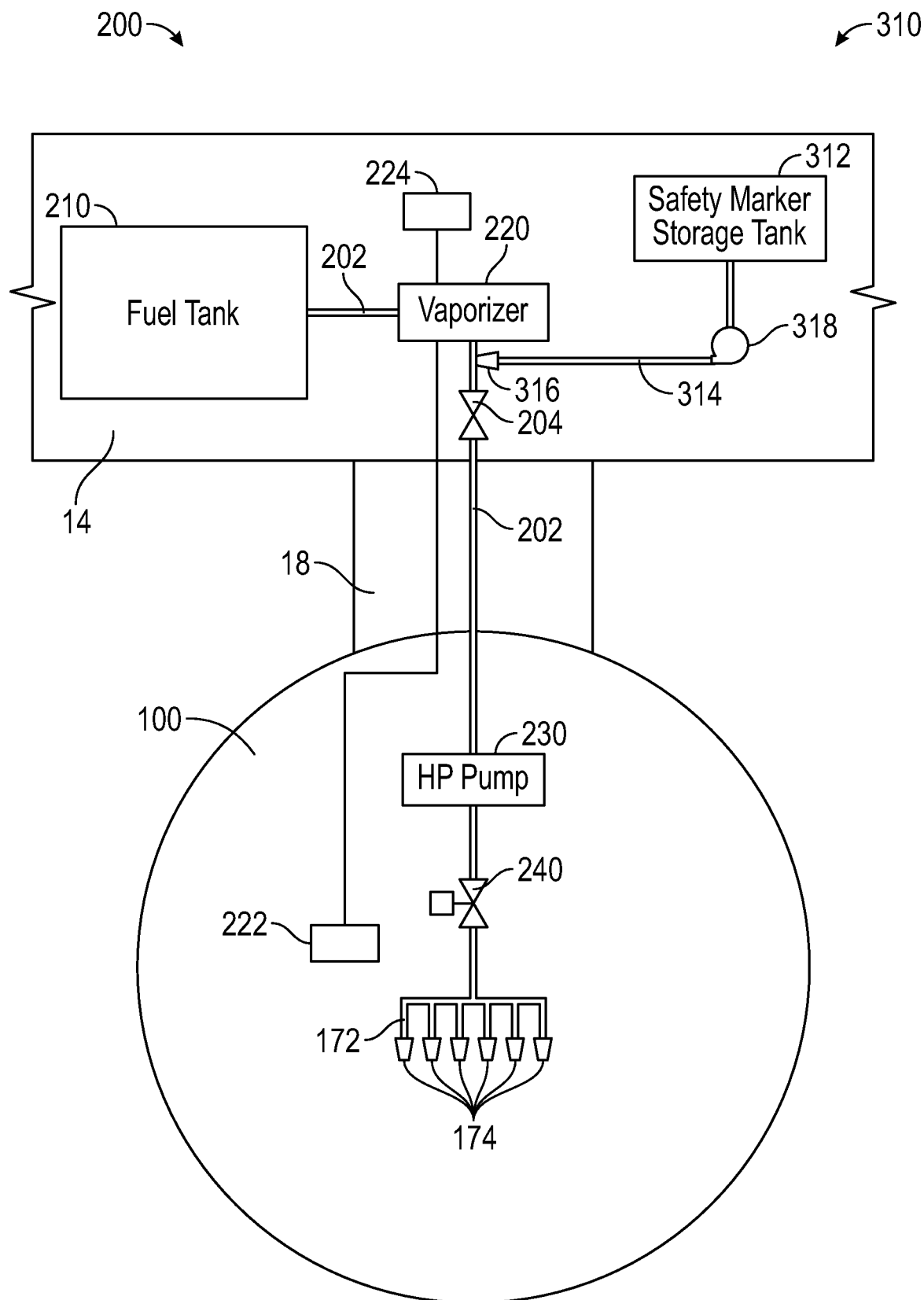
FIG. 7 is a schematic view of the fuel system with the safety marker introduction system connected to the fuel system at a location different than in the fuel system shown in FIG. 3.

To detect leaks and to maximize the safety of the fuel system 200, the safety marker is preferably introduced just after the liquid hydrogen fuel is heated to a gas, or even as it is being heated to a gas. In this embodiment, the nozzle 316 is located in the vaporizer 220 and the safety marker is supplied to the vaporizer 220 in the fuel system 200. In other embodiments, the safety marker can be added downstream of the vaporizer 220, such as by being supplied to the fuel delivery assembly 202, as shown in FIG. 7. FIG. 7 is a schematic view of the fuel system 200, similar to that shown in FIG. 3, but, with an alternate safety marker introduction point. In FIG. 7, the nozzle 316 is the component directly succeeding the vaporizer 220. Preferably, the nozzle 316 would be located in a portion of the fuel delivery assembly 202 proximate to or even adjacent to the vaporizer 220. However, the safety marker may be added to the hydrogen fuel in the fuel system 200 at any point where the fuel is a gas. In another embodiment, for example, the safety marker may be added to the fuel tank. As discussed above, the remaining volume of the fuel tank 210 not filled with liquid hydrogen fuel may be gaseous hydrogen. The safety marker may be added to this gaseous hydrogen.

The safety marker introduction system 310 shown in FIGS. 3 and 7 is positioned at least partially within the fuselage 12 or the wing 14, such as at least partially within the wing 14. The safety marker introduction system 310 may, however, be located at other suitable locations, such as external to the fuselage 12 and the wing 14 and positioned at least partially within the pylon 18, as shown in FIG. 4, or the engine 100, as shown in FIG. 5. When positioned in the engine 100, the safety marker introduction system 310 may be located in the nacelle 134, for example. In addition, one safety marker introduction system 310 is shown in FIG. 3. This safety marker introduction system 310 may be used to add a blend of safety markers, such as both the odorant and the visual safety marker, or the safety marker introduction system 310 may be used to add one safety marker. A plurality of safety marker introduction systems 310 may also be used, for example, one safety marker introduction system 310 for the odorant, and another safety marker introduction system 310 for the visual safety marker. In a preferred embodiment, the visual safety marker may be helium and added to the liquid hydrogen fuel that is stored in the fuel tank 210. In this way, a single safety marker introduction system 310 is used to add the odorant.

As shown in FIG. 6, the hydrogen fuel is delivered to the power generator, which, in this embodiment, is the engine 100, in step S420, after the safety marker has been added in step S415. Delivering the hydrogen fuel to the engine 100 in step S420 may include increasing the pressure of the hydrogen fuel with the high-pressure pump 230 (step S423), metering the hydrogen fuel with the metering valve 240 (step S425), distributing the hydrogen fuel in the fuel manifold 172 (step S427), and injecting the hydrogen fuel into the combustion section 114 with the fuel nozzles 174 (step S429). After the fuel has been injected into the combustion section 114, the hydrogen is combusted in step S430 as discussed above.

Additives, such as the safety markers, added to the hydrogen fuel may separate from the hydrogen gas. If the safety marker separates from the gaseous or supercritical hydrogen fuel while in the fuel system 200, the safety marker may not have the desired effect of alerting personnel to a leak as the hydrogen fuel may escape without the safety marker. It is thus preferable to include a plurality of turbulators 206 in the fuel delivery assembly 202 to generate turbulence in the flow of gaseous or supercritical hydrogen fuel. The turbulence promotes mixing of the hydrogen fuel with the safety marker to keep the safety marker entrained in the hydrogen fuel. Delivery of the hydrogen fuel to the engine 100 (step S420) may also include the step (step S421) of adding turbulence to the hydrogen fuel.

Various suitable turbulators 206 may be used, including, for example, a zig-zagging strip of metal or a helical (twisted) strip of metal placed in the flow path of the hydrogen fuel (e.g., the fuel delivery assembly 202) to generate turbulence in the flow of the hydrogen fuel. In other instances, however, the other components of the fuel system 200 may act as turbulators 206. For example, the fuel system 200 may include various other components, such as valve 204, in the fuel delivery assembly 202 between the vaporizer 220 and the engine 100, and such components may create turbulence in the flow of the hydrogen fuel and act as a turbulator 206.

Figure 8:
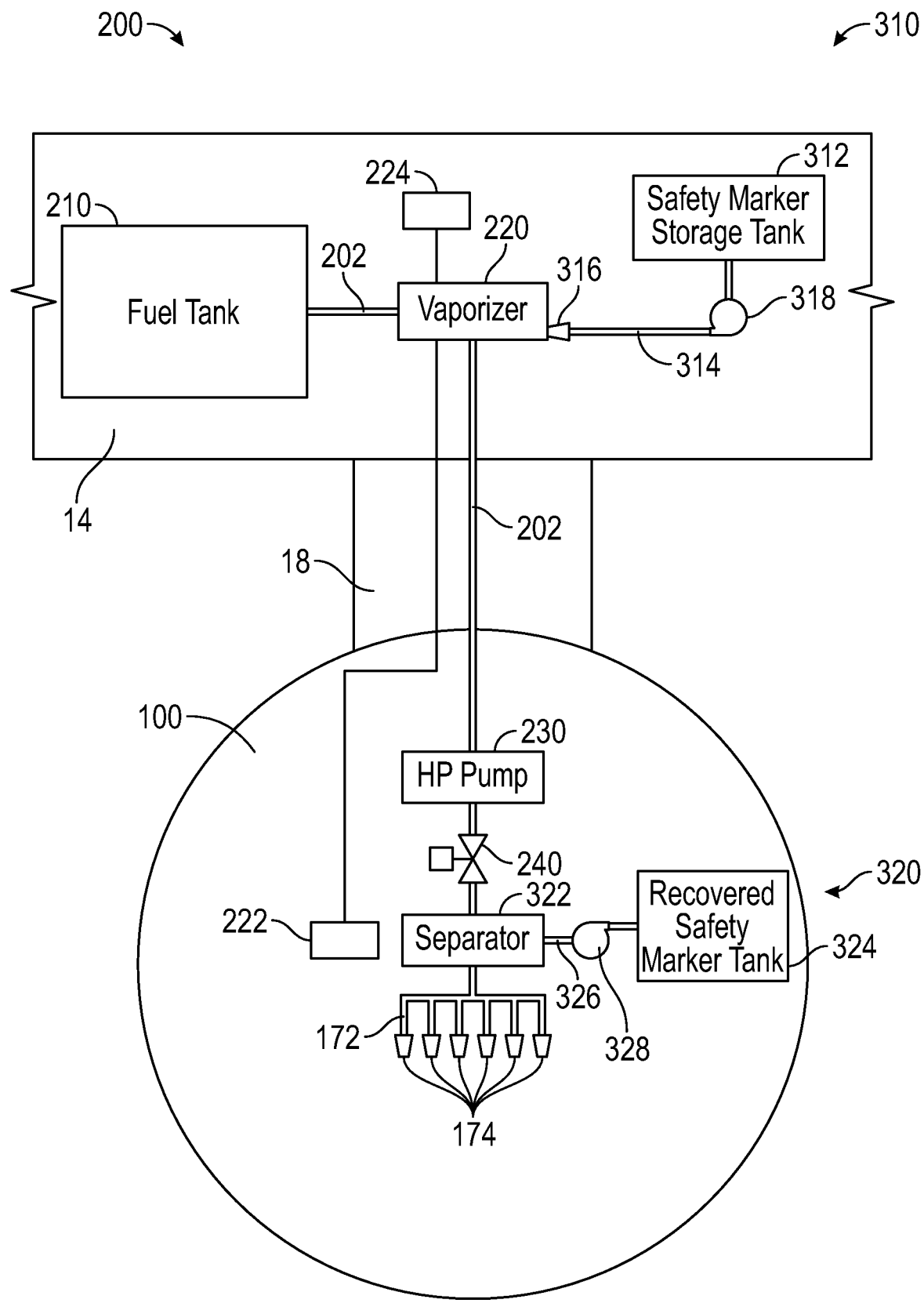
FIG. 8 is a schematic view of the fuel system including a safety marker separation and recovery system according to an embodiment of the present disclosure.
Figure 9:
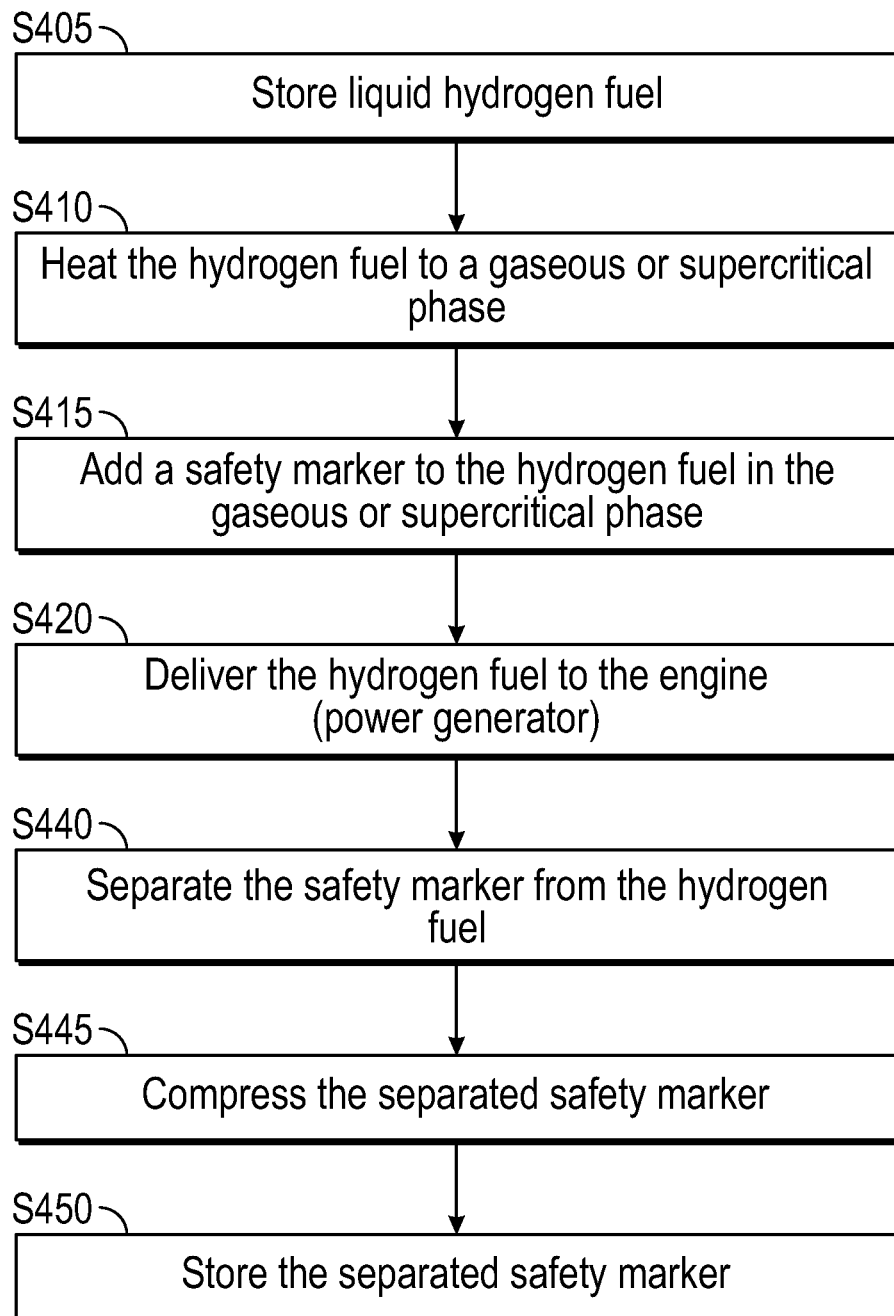
FIG. 9 is a flow chart showing a method of removing a safety marker from the hydrogen fuel in the fuel delivery system shown in FIG. 8.

The safety markers may be combusted with the hydrogen fuel in the engine 100. However, some of the safety markers discussed above, such as the noble gases, may be expensive, and, thus, instead of allowing the safety markers to remain in the hydrogen fuel through combustion, the safety markers may be removed from the hydrogen fuel prior to combustion. In addition, some of the safety markers discussed herein, such as the odorants, may fowl the fuel nozzles 174 and contribute to the corrosion of turbine components, and thus it is preferable to remove the safety markers prior to the fuel nozzles 174. FIG. 8 is a schematic view of the fuel system 200, which includes a safety marker separation and recovery system 320, and FIG. 9 is a flow chart showing a method of removing a safety marker from the hydrogen fuel. When used with the fuel system 200 discussed above and the method shown in FIG. 6, steps S405 to S420 may be the same and a detailed description is omitted here.

Figure 10:
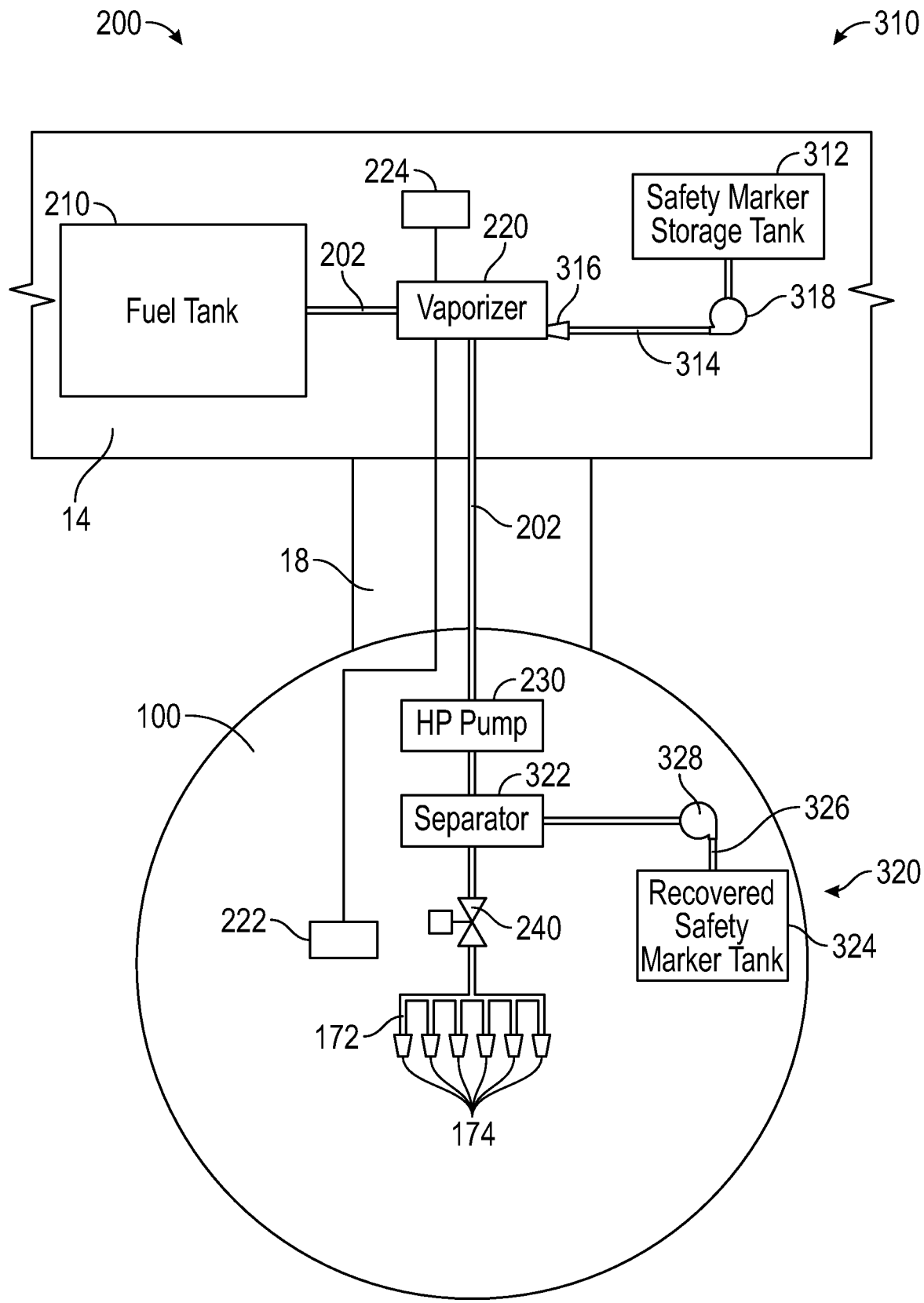
FIG. 10 is a schematic view of the fuel system with a separator of the safety marker separation and recovery system connected to the fuel system at a location different than in the fuel system shown in FIG. 9.

In step S440, the safety marker is separated from the hydrogen fuel. The safety marker separation and recovery system 320 includes a separator 322 in fluid communication with the fuel delivery assembly 202 to separate the safety marker from the hydrogen fuel. As discussed above, it is preferable for the safety marker to remain in the hydrogen fuel for as much of the fuel delivery assembly 202 as possible. As shown in FIG. 8, the separator 322 is positioned in the flow path of the hydrogen fuel between the metering valve 240 and the fuel nozzles 174, and more specifically between the metering valve 240 and the fuel manifold 172, in the fuel delivery assembly 202. The separator 322 may be positioned at other suitable locations in the flow path of the hydrogen fuel. For example, the separator 322 may be positioned upstream of the metering valve 240 and, preferably, directly preceding the metering valve 240 in the flow path of the hydrogen fuel in the fuel delivery assembly 202, as shown in FIG. 10. Such a position may be beneficial to avoid issues with metering and distributing the hydrogen fuel to the fuel nozzles 174. Suitable separators 322 include, for example, a cyclonic separator or a filtration system. An example of a suitable cyclonic separator is the separation device disclosed in U.S. Pat. No. 8,858,679, the disclosure of which is incorporated by reference herein in its entirety. The filtration system may include at least one filter or a membrane that allows the hydrogen fuel (diatomic hydrogen molecules) to pass through the filter or membrane, but prevents the safety marker from passing through. In some embodiments, a plurality of separators may be used, including, for example, both a cyclonic separator and a filtration system.

After being separated in Step S440, the safety marker is stored (step S450) in a recovered safety marker storage tank 324. The recovered safety marker storage tank 324 is fluidly coupled to the separator 322 by a recovered safety marker line 326. The recovered safety marker line 326 may be a suitable fluid connection such as a tube, pipe, or the like. To reduce the size of the recovered safety marker storage tank 324, the safety marker separation and recovery system 320 may include a compressor 328 to compress the safety marker in the recovered safety marker storage tank 324, and the method (shown in FIG. 9) also includes the step of compressing the separated safety marker (step S445).

Figure 11:
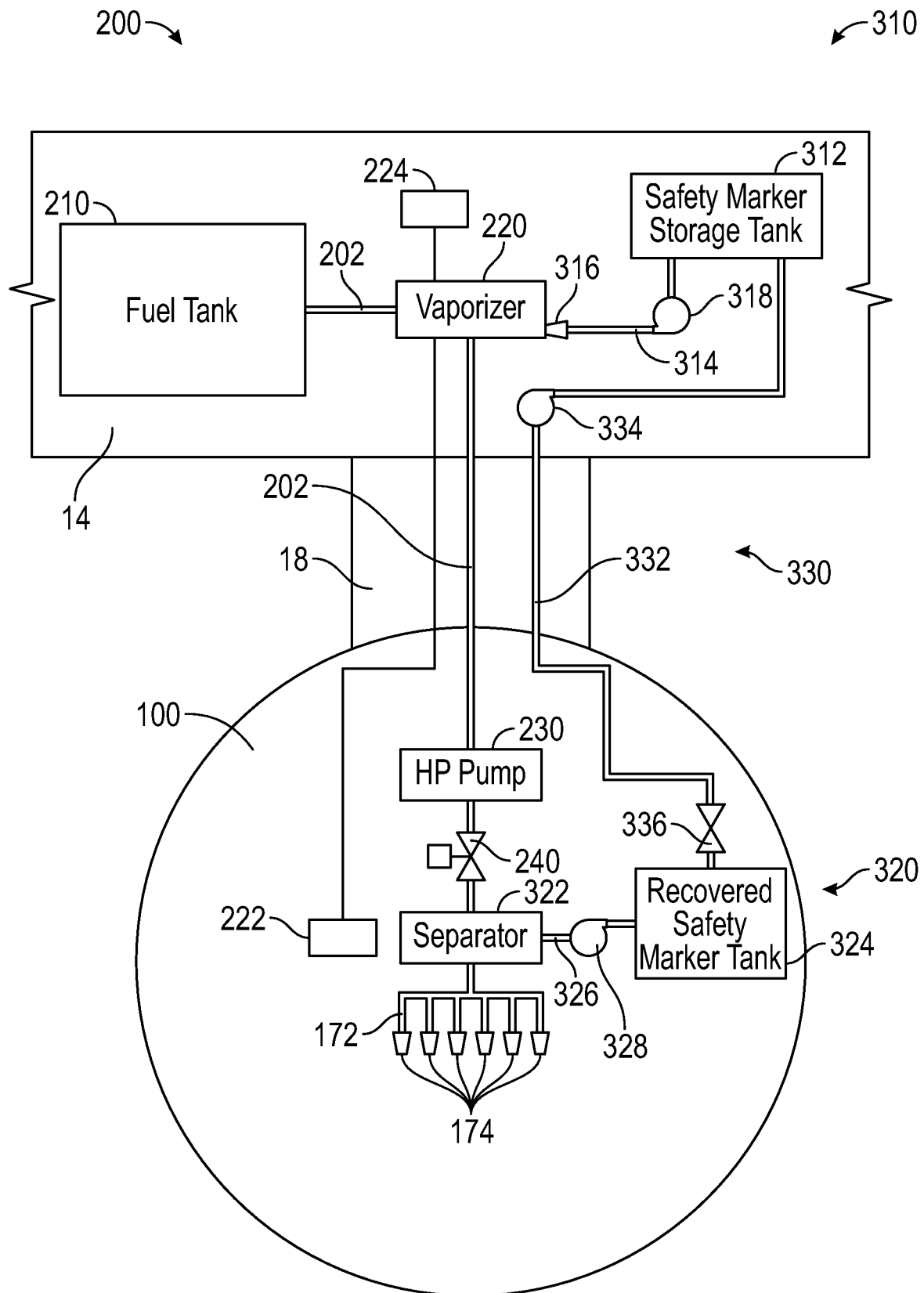
FIG. 11 is a schematic view of the fuel system including a safety marker separation and recovery system according to another embodiment of the present disclosure.
Figure 12:
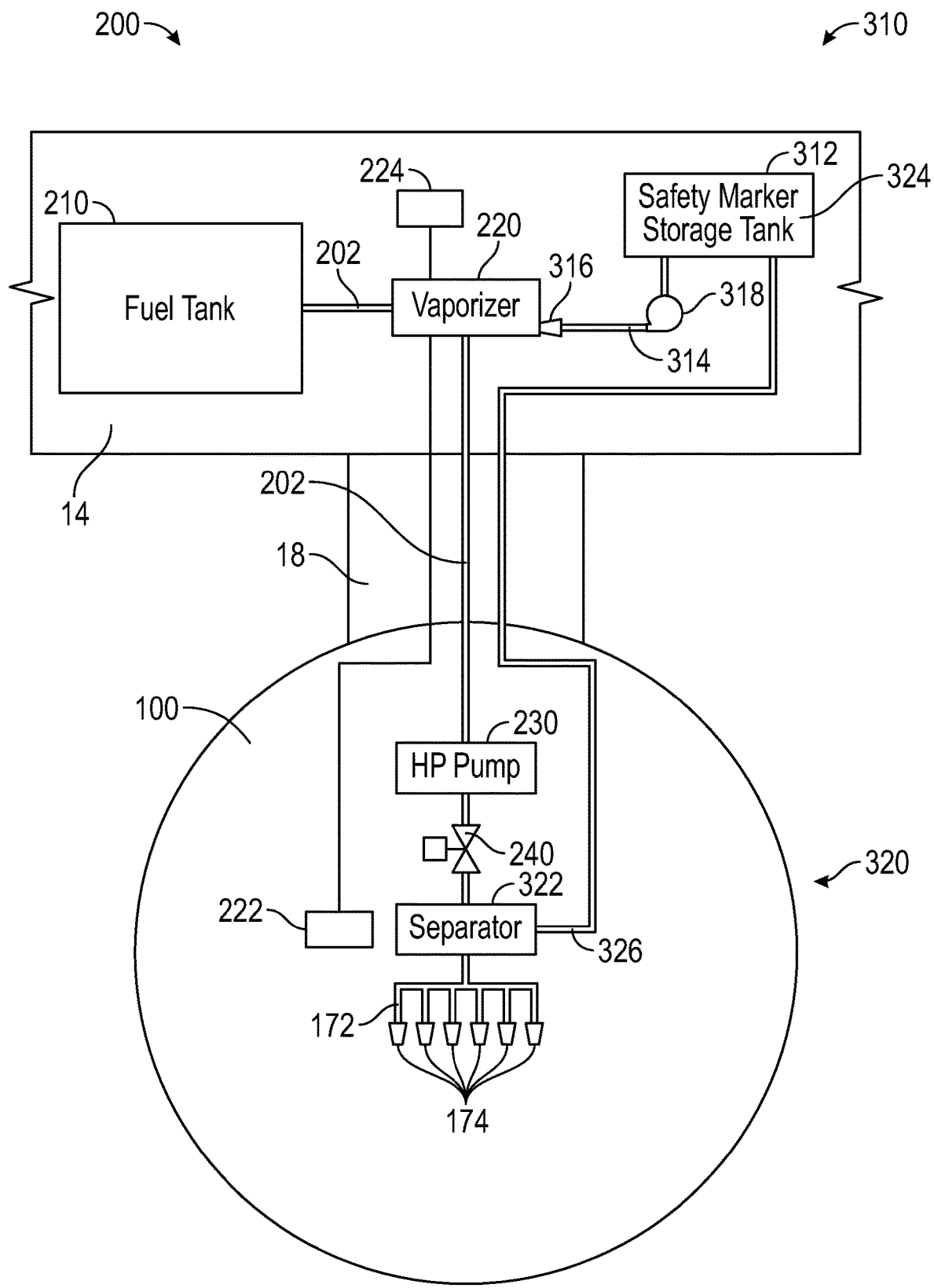
FIG. 12 is a schematic view of the fuel system including a safety marker separation and recovery system according to a further embodiment of the present disclosure.

The safety marker stored in the recovered safety marker storage tank 324 can subsequently be recovered for reuse. In FIG. 8, the recovered safety marker storage tank 324 is shown in the engine 100. The recovered safety marker storage tank 324 and other components of the safety marker separation and recovery system 320, such as the compressor 328, may, however, be positioned at least partially within the pylon 18, the wing 14, or the fuselage 12. In FIG. 8, the safety marker separation and recovery system 320 is configured such that the safety marker is removed from the recovered safety marker storage tank 324 and the aircraft 10 before the safety marker is reused. But, the embodiments are not so limited. For example, as shown in FIG. 11, the recovered safety marker storage tank 324 may be fluidly coupled to the safety marker introduction system 310 by, for example, a transfer line 332, and the safety marker may be recovered and subsequently reused during operation of the aircraft 10. The transfer line 332 may be any suitable fluid connection such as a pipe, tube, or the like. The transfer line 332 is part of a safety marker transfer system 330. The safety marker transfer system 330 may have other components used to effect the transfer of the recovered safety marker from the recovered safety marker storage tank 324 to the safety marker storage tank 312, such as a transfer pump 334 and a transfer valve 336, for example. The transfer valve 336 may be opened and the transfer pump 334 operated to transfer the safety marker though the transfer line 332 from the recovered safety marker storage tank 324 to the safety marker storage tank 312. Alternatively, the recovered safety marker storage tank 324 may be omitted and the recovered safety marker may be returned to the safety marker storage tank 312 after it is separated by the separator 322, as shown in FIG. 12. In addition, the separated safety marker could be exhausted to the environment, instead of being stored in the safety marker storage tank 324 or otherwise reused.

The embodiments discussed above described the use of the safety markers in a system where the hydrogen fuel is stored as a liquid in the fuel tank 210. However, the use of the safety markers discussed herein are not so limited and they may be used with fuel systems 200 where the hydrogen fuel is stored in a gaseous phase. In such a system, the safety markers may be added into the fuel to be stored in the fuel tank 210, before the fuel tank 210 is filled. In such a system, the vaporizer 220 and the safety marker introduction system 310 may be omitted. Also as discussed above, the power generator is not limited to a gas turbine engine 100. Instead, the power generator may be a fuel cell where the hydrogen is provided to the fuel cell to generate electricity by reacting with air.

Further aspects of the present disclosure are provided by the subject matter of the following clauses.

A fuel comprising hydrogen and a visual safety marker, the visual safety marker being a noble gas.

The fuel of any preceding clause, wherein the visual safety marker has a mole fraction in the fuel between $1 \times 10^{-10}$ mol/mol and $1 \times 10^{-2}$ mol/mol.

The fuel of any preceding clause, wherein the hydrogen is liquid, and the visual safety marker is helium.

The fuel of any preceding clause, wherein, when the fuel is burning, the hydrogen produces a flame and the molecules of the noble gas are excited by the heat of the flame to produce visible light.

The fuel of any preceding clause, wherein, when the is fuel burning, the hydrogen produces a flame and the visual safety marker is capable of coloring the flame of the fuel to be visible in sunlight.

The fuel of any preceding clause, further comprising an odorant.

The fuel of any preceding clause, wherein the odorant is one of mercaptan or a sulfide.

An aircraft comprising a gas turbine engine, wherein a gas combusted by the engine comprises the fuel of any preceding clause.

A fuel system for a vehicle having a power generator, the fuel system comprising: a fuel tank for holding a hydrogen fuel in a liquid phase; a fuel delivery assembly extending from the fuel tank to a power generator, the fuel delivery assembly being configured to provide the hydrogen fuel from the fuel tank to the power generator; a vaporizer in communication with the fuel delivery assembly for heating the hydrogen fuel in the liquid phase to at least one of a gaseous phase and a supercritical phase, the vaporizer being located between the fuel tank and the power generator; a safety marker tank for holding a safety marker; and a safety marker delivery assembly extending from the safety marker tank to the fuel delivery assembly, the safety marker delivery assembly being (i) connected to the fuel delivery assembly at a safety marker introduction position and (ii) configured to add a safety marker into the hydrogen fuel when the hydrogen fuel is in the at least one of the gaseous phase and the supercritical phase, the safety marker introduction position being the vaporizer or a position upstream of the vaporizer.

The fuel system of any preceding clause, wherein, when the fuel is burning, the hydrogen fuel produces a flame, and wherein the safety marker is a visual safety marker that enables the flame of the hydrogen fuel to be visible in sunlight when the hydrogen fuel is burning.

The fuel system of claim any preceding clause, wherein the visual safety marker is a noble gas.

The fuel system of any preceding clause, wherein the visual safety marker is added to have a mole fraction in the hydrogen fuel between $1 \times 10^{-10}$ mol/mol and $1 \times 10^{-2}$ mol/mol.

The fuel system of any preceding clause, wherein the safety marker is an odorant.

The fuel system of any preceding clause, wherein the odorant is one of mercaptan or a sulfide.

The fuel system of any preceding clause, wherein the fuel delivery assembly includes a turbulator downstream of the safety marker introduction position where the safety marker delivery assembly is connected to the fuel delivery assembly, the turbulator being configured to generate turbulence in the hydrogen fuel as the hydrogen fuel is being delivered from the fuel tank to the power generator.

An aircraft comprising a the fuel system of any preceding clause, wherein the power generator is a gas turbine engine.

The aircraft of any preceding clause, further comprising a fuselage and a wing connected to the fuselage, wherein the fuel tank is positioned at least partially within at least one of the fuselage and the wing.

The aircraft of any preceding clause, wherein the vaporizer is positioned at least partially within at least one of the fuselage and the wing.

The aircraft of any preceding clause, wherein the safety marker delivery assembly is positioned at least partially within at least one of the fuselage and the wing.

The aircraft of any preceding clause, wherein the vaporizer is positioned at least partially within the gas turbine engine.

The aircraft of any preceding clause, wherein the safety marker delivery assembly is positioned at least partially within the gas turbine engine.

The aircraft of any preceding clause, further comprising a pylon connecting the gas turbine engine to the wing, wherein the vaporizer is positioned at least partially within the pylon.

The aircraft of any preceding clause, further comprising a pylon connecting the gas turbine engine to the wing, wherein the safety marker delivery assembly is positioned at least partially within the pylon.

A method of adding a safety marker to hydrogen fuel in a fuel delivery system, the method comprising: storing hydrogen fuel in a tank in a liquid phase; heating the hydrogen fuel in the liquid phase to at least one of a gaseous phase and a supercritical phase; delivering the hydrogen fuel in the at least one of the gaseous phase and the supercritical phase to a power generator; and adding a safety marker to the hydrogen fuel when the hydrogen fuel is in the at least one of the gaseous phase and the supercritical phase after heating the hydrogen fuel.

The method of any preceding clause, wherein the safety marker is a visual safety marker that enables the flame of the hydrogen fuel to be visible in sunlight when the hydrogen fuel is burning.

The method of any preceding clause, wherein the visual safety marker is a noble gas.

The method of any preceding clause, wherein the visual safety marker is added to have a mole fraction in the hydrogen fuel between $1\times10^{-10}$ mol/mol and $1\times10^{-2}$ mol/mol.

The method of any preceding clause, wherein the safety marker is an odorant.

The method of any preceding clause, wherein the odorant is one of mercaptan or a sulfide.

The method of any preceding clause, further comprising adding turbulence to the hydrogen fuel as it is delivered.

A fuel comprising hydrogen and a safety marker.

The fuel of any preceding clause wherein the hydrogen is diatomic hydrogen.

The fuel of any preceding clause wherein the safety marker is at least one of a visual safety marker and an odorant.

The fuel of any preceding clause wherein the safety marker is both a visual safety marker and an odorant.

The fuel of any preceding clause wherein the visual safety marker is a noble gas.

The fuel of any preceding clause wherein the visual safety marker is at least one of helium, neon, argon, krypton, xenon, and radon.

The fuel of any preceding clause wherein the odorant is at least one of mercaptan, hydrogen sulfide, benzyl sulfide, bimethyl sulfide, and diphenyl sulfide.

The fuel of any preceding clause wherein the safety marker is at least one of helium, neon, argon, krypton, xenon, radon, mercaptan, hydrogen sulfide, benzyl sulfide, bimethyl sulfide, and diphenyl sulfide.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

What we claim is:

1. A fuel comprising hydrogen and a visual safety marker, the visual safety marker being a noble gas and having a mole fraction in the fuel between $1\times10^{-10}$ mol/mol and $1\times10^{-2}$ mol/mol.

2. The fuel of claim 1, wherein the hydrogen is liquid, and the visual safety marker is helium.

3. The fuel of claim 1, wherein, when the fuel is burning, the hydrogen produces a flame and the molecules of the noble gas are excited by the heat of the flame to produce visible light.

4. The fuel of claim 1, wherein, when the fuel is burning, the hydrogen produces a flame and the visual safety marker is capable of coloring the flame of the fuel to be visible in sunlight.

5. The fuel of claim 1, further comprising an odorant.

6. The fuel of claim 5, wherein the odorant is one of mercaptan or a sulfide.

7. An aircraft comprising a gas turbine engine, wherein a gas combusted by the engine comprises the fuel of claim 1.

* * * * *